United States Patent [19]

Hubert et al.

[11] 4,325,586
[45] Apr. 20, 1982

[54] ELECTROMAGNETIC PROCESS FOR CONTROLLING ORIENTATION OF A PLATFORM AND PLATFORM FOR CARRYING OUT SAID PROCESS

[75] Inventors: Bernard Hubert, Le Cannet; Pierre Poubeau, Le Pecq, both of France

[73] Assignee: Societe Nationale Industrielle Aerospatiale, France

[21] Appl. No.: 125,058

[22] Filed: Feb. 27, 1980

[30] Foreign Application Priority Data

Feb. 28, 1979 [FR] France .................. 79 05283

[51] Int. Cl.$^3$ ............................ F16C 39/06
[52] U.S. Cl. ...................... 308/10; 244/166; 244/171; 318/649; 244/166;171;170;176;177
[58] Field of Search ........................... 308/10

[56] References Cited

U.S. PATENT DOCUMENTS

| 3,775,656 | 11/1973 | Romans | 318/649 |
| 3,877,761 | 4/1975 | Boden | 308/10 |
| 3,890,019 | 6/1975 | Boden | 308/10 |
| 3,955,858 | 5/1976 | Poubeau | 308/10 |

*Primary Examiner*—R. Skudy
*Attorney, Agent, or Firm*—Karl W. Flocks; A. Fred Starobin

[57] ABSTRACT

Electromagnetic method and apparatus to accurately control the orientation of a platform according to two axes wherein pivoting of the platform about two orthogonal axes passing through its center is effected by electromagnetic means, with the servo-control being obtained by using a detector responsive to the angle of deviation from a reference direction, an amplifier, a low-pass filter, a phase lead filter and power amplifiers supplying currents to the electromagnetic devices. The method and apparatus is particularly adapted to the orientation of platforms carrying means such as aerials or inertia wheels intended for piloting a space vehicle.

9 Claims, 11 Drawing Figures

ELECTROMAGNETIC PROCESS FOR CONTROLLING ORIENTATION OF A PLATFORM AND PLATFORM FOR CARRYING OUT SAID PROCESS

This invention relates to the domain of platforms for supporting units to be accurately oriented according to two axes and more particularly it relates to orientation of aerials and inertia wheels aboard satellites to control the course of the latter.

It is known to provide mechanical solutions to the problems raised by the orientation of such platforms.

Some of the known solutions start from the principle on which the connections with two axes of articulation of the cardan type are based and which provide for two degrees of freedom which are totally independent of one another. It is to be noted in this respect that most of the known sight and bearing pointing devices rely on said principle.

Unfortunately, all the known devices comprise mechanical connecting members involving frictions productive of torques in joints which necessarily entail wear which cannot be prevented and is not admissible aboard a satellite.

Although such mechanical reactions can be neglected in most cases, they would disturb the operation of a satellite where the pointing characteristics of the aerial specifically depends on the absence of destabilizing torques.

Various efforts have been made to avoid mechanical connections, however, the applicant does not know of any experiment leading to practical realizations such as those proposed by this invention.

According to this invention, the platform carrying the unit to be oriented whether it be for instance an aerial or an inertia wheel for piloting a space vehicle with or without kinetic energy storage, is controlled along two axes by electromagnetic means substantially characterized in that not only frictions of any type are practically avoided but also the control currents for controlling the orientation may be made strictly proportional to angular motions of the platform so that they can readily be used for servo-controlling the latter.

The invention will be more easily understood in the light of the following description of several forms of embodiment with reference to the attached drawings in which.

Figure 1:
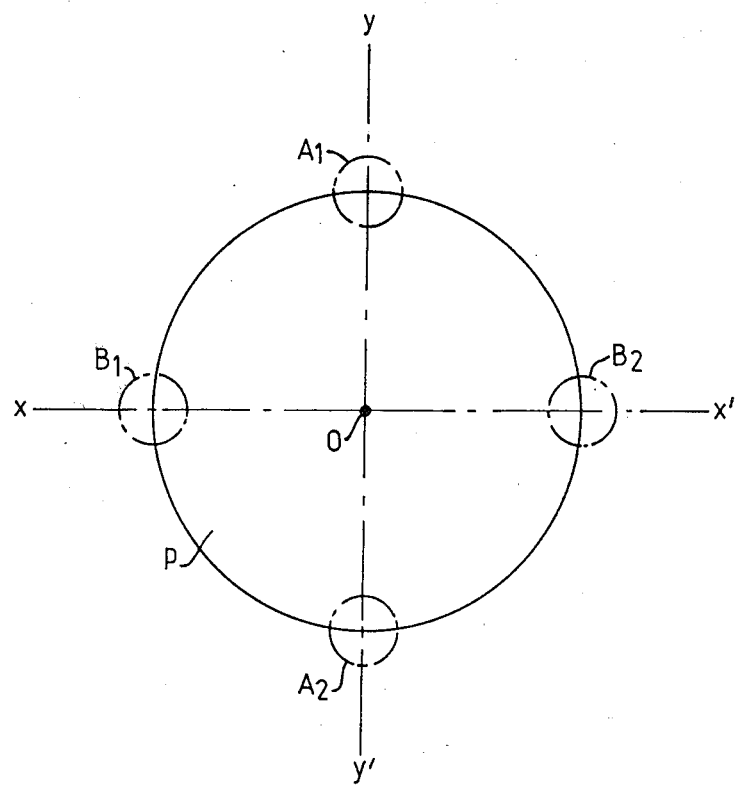
FIG. 1 is a schematic front view showing the location of zones in which the electromagnetic devices for orienting a platform are disposed according to the invention.
Figure 2:
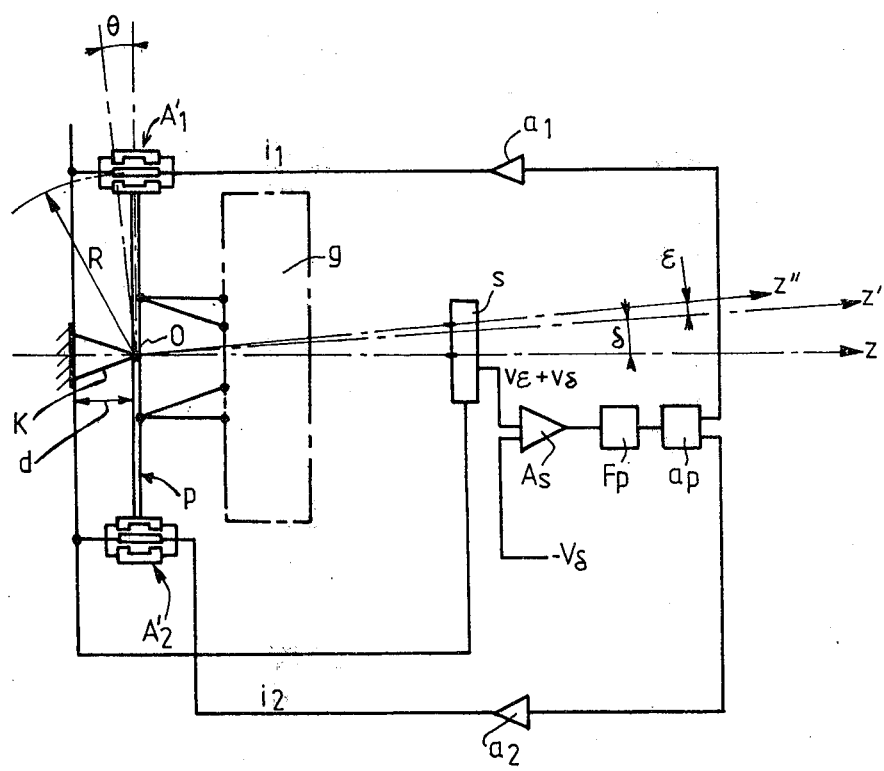
FIG. 2 is a schematic view showing in axial cross-section the location of the various elements to be used according to the invention.

Referring to FIGS. 1 and 2 it is clear that the problem to be solved consists in enabling a platform, schematically and figuratively shown as the plane p, passing through the point O, substantially held at distance d, with, for example, an inertial wheel g mounted thereon, to pivot without occurrence of frictions by means of an efficient servo-control.

The platform p pivots about axes x, x', and y, y'. According to the invention this results from the use of electromagnetic means located on said axes in zones A1,A2 and B1, B2 respectively.

Although the electromagnetic means might differ from the types shown, as will be explained hereinafter it was necessary to illustrate them specifically on FIG. 2 so as to facilitate comprehension of the basic principle of this invention.

Moreover, point O can be held at distance d in various ways, in particular by mechanical means as explained in detail hereinafter.

The connection means to secure point O implies a stiffness K which must be taken into account in the calculation of the characteristics of the servo-control determining the orientation of the platform.

Referring to FIG. 2 the servo-control operates by relying on a detector S responsive to the deviation angle $(\epsilon + \delta)$ representing the error between the reference direction OZ and the direction actually aimed at OZ", with direction OZ' being the selected reference direction and $\delta$ a possible permanent deviation angle.

In this way, the servo-control is such that there is constant proportionality between the error signal $\epsilon$ as measured by detector S, after subtraction therefrom of the selected permanent deviation angle (which may be for instance of the radio frequency type with a satellite aerial), and current i in the coils of the electromagnetic devices A1, A2, B1 and B2.

These electromagnetic devices are based on the Laplace electrodynamic interaction between the magnetic field and the current in the coils $$F = \int i \, dl \, B$$

and behave as moveable coil galvanometers of the linear configuration.

Figure 3:
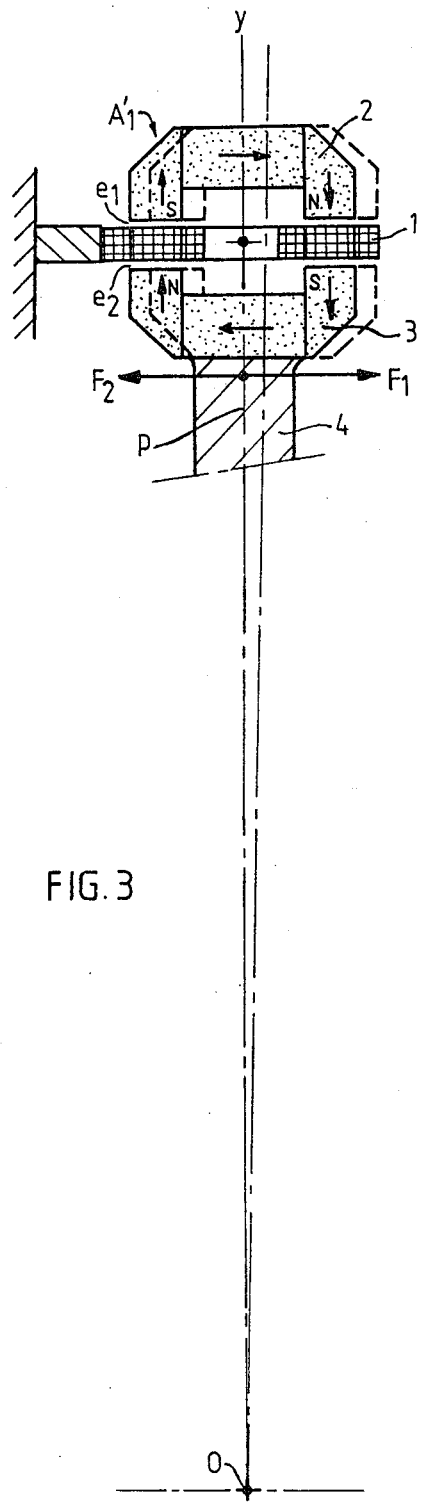
FIG. 3 is a partially schematic view in axial cross section showing the electromagnetic mechanism for orienting the platform as illustrated on FIG. 2 in an exemplifying form of embodiment.

In the electromagnetic devices A'1, A'2 shown on FIG. 2, one of which is illustrated at a larger scale on FIG. 3, the wires of coil 1 are parallel to plane p in a direction substantially at right angles to axis oy.

The coil 1 mechanically connected to the stationary plane is disposed perpendicularly to plane p in gaps E1, E2 of permanent magnets 2 and 3 respectively, which are connected to platform 4 containing plane p in such a manner that when current i from the servo-control and amplifier unit flows through coil 1, forces F1 (or F2, depending on the direction of flow of the current) reactionally appearing on magnets 2 and 3 cause rotation of plane p.

The force lines of magnetic induction B being perpendicular to the conductors, the expression of the force, as a function of current i, the number of turns n in the coil, the length l of wire in each gap and each turn, can be expressed by the following relation:

$$F = 2Blni$$

which shows that the force is proportional to the current flowing in the coil; the direction of said force depends on the direction of the current.

Since the servo-control was designed to benefit from the constant proportionality between the error signal $\epsilon$ measured by detector S and currents i1, i2 flowing in the coils of devices A1, A2 (or currents i3, i4 flowing in the coils of devices B1, B2), it can be determined that the proportionality coefficient which is the gain k of the servo-loop must be such as to ensure the accuracy of the desired orientation.

Referring to FIG. 2 detector S provides a voltage $V_{6s}$ proportional to the detected deviation angle $\epsilon$, which for a given gain is equal to:

$$V\epsilon = K5\epsilon$$

As the current flowing in the coils produces an electromotive force equal to:

$$F = 2Blni$$

at each electromagnetic device, it results that the resulting torque for both electromagnetic devices located at distance R from the centre of rotation 0 is equal to:

$$C = 4RBlni$$

If stiffness K of the connecting device is taken into account the platform is submitted to a rotation $\theta$ resulting from the following:

$$C = K\theta$$
$$\text{where } \theta = \frac{4RBlni}{K}$$

Since each power amplifier a1, a2 or a3, a4 supplies a current i1, i2 or i3, i4 such as

| in$_y$ | in$_x$ |
|---|---|
| i1 = K1 V$_e$ | i3 = K3 V$_e$ |
| i2 = K2 V$_e$ | i4 = K4 V$_e$ | one can obtain the following relation:

$$\theta = \frac{2RBln(K1 + K2)Kse}{K}$$
or
$$\theta = \frac{2RBln(K3 + K4)Kse}{K}$$

Obviously, the most frequent case will be when K1=K2 and K3=K4. The gain which corresponds to the proportionality coefficient between current and detection can be selected such that for the maximum value of rotation $\theta$ the orientation error $\epsilon$ is limited to the desired value.

For instance, for orienting a satellite aerial there will be no specific difficulty with $\epsilon$ higher than 0.01 degree for $\theta = 0.5$ degree.

Thus, the servo-control unit in the dynamic phase might consist of the following:

As represents the amplifier for the error signal V$_\epsilon$ from the detector S, taking into account signal V$_\delta$ resulting from the selected permanent deviation angle $\delta$.

Fp is a low-pass filter to cancel the noise occurring in the signal from the detector S.

ap is a filter to provide phase feed to the current control with respect to detection to ensure active dampening of the oscillating unit consisting of the connecting system with stiffness K and the inertia of the platform.

a1, a2 are power amplifiers supplying currents i1, i2 to the electromagnetic devices A'1, A'2 (amplifiers a3, a4, not shown, supply currents i3, i4 respectively to electromagnetic devices B1, B2).

Figure 9:
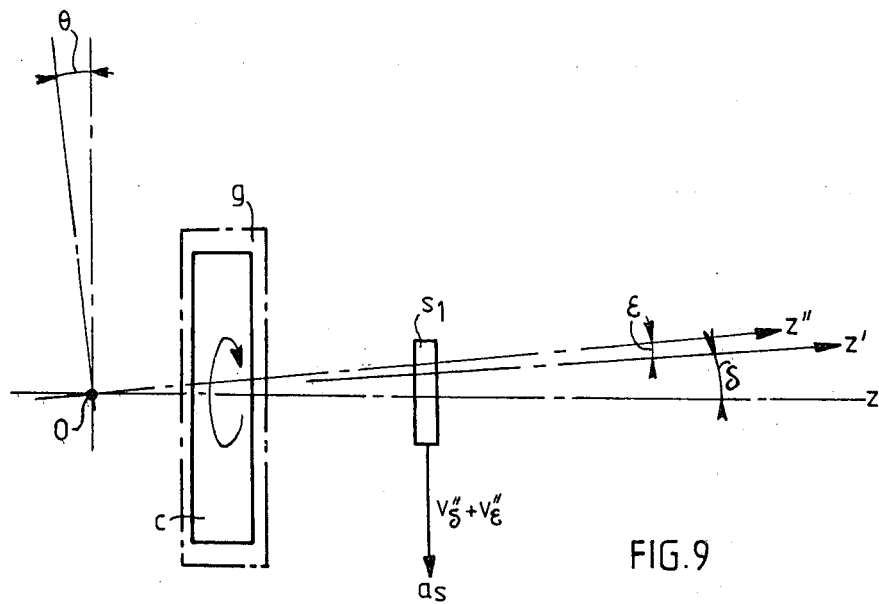
FIG. 9 is a partially schematic view in axial cross section showing in an exemplifying form of embodiment how the invention can be applied to orient a platform carrying an inertia wheel for a satellite.
Figure 8:
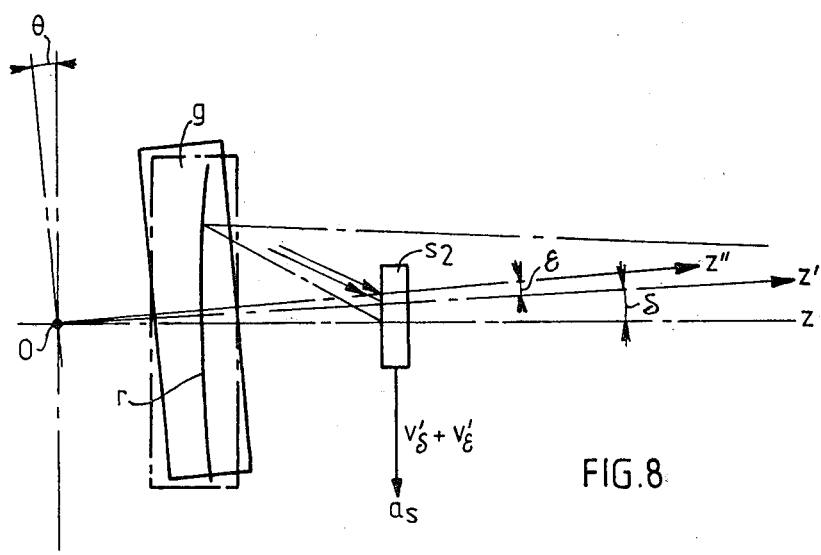
FIG. 8 is a partially schematic view in axial cross section showing in an exemplifying form of embodiment how to apply this invention to orient a platform carrying an aerial directed to a satellite.

It will be understood that the above mentioned explanation relative to the orientation of an aerial to a satellite can easily be transposed to obtain the orientation of the rotation axis of an inertia wheel and in such a case only the detector must be correspondingly adapted according to the x axis and the y axis. FIGS. 8 and 9 respectively illustrate an orientation system for aerial r with its deviation detector supplying signals v'$_\epsilon$ for the deviation $\epsilon$ and possibly v'$_\delta$ for constant deviation $\delta$ and an orientation system for the rotation axis of one or two inertia wheels g and c, with g comprising or not kinetic energy storage, with its deviation detector supplying signals v"$_\epsilon$ of deviation $\epsilon$ and possibly v"$_\delta$ of constant deviation $\delta$ to thereby permit piloting of the satellite.

Other equivalent devices can be envisaged according to this invention to replace the electromagnetic device shown on FIG. 3.

Figure 5:
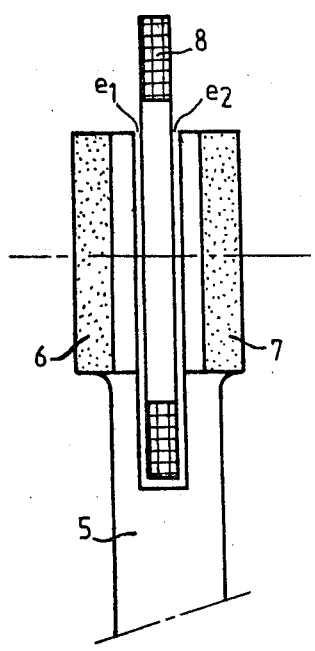
FIG. 5 is a cross-sectional view along line V—V on FIG. 4.
Figure 4:
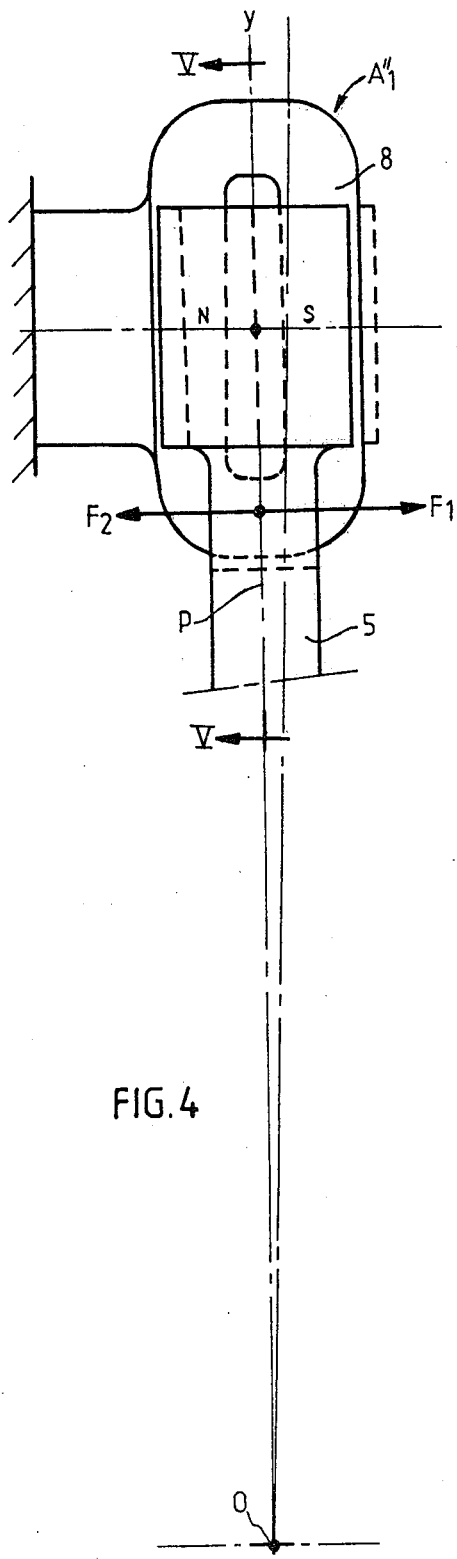
FIG. 4 is a partially schematic view in axial cross section showing an exemplifying form of embodiment of another electromagnetic mechanism for orienting the platform.

For instance, each electromagnetic device A"1 among those shown on FIGS. 4 and 5 comprises two pairs of permanent magnets 6, 7 secured to the platform 5 containing plane p and surrounding, parallel to plane p, coil 8 fastened to the supporting plane.

The coil detectors mounted in gaps e1, e2 produce, depending on the direction of flow of the current, forces F1 or F2 acting upon the platform so as to move it angularly.

Figure 7:
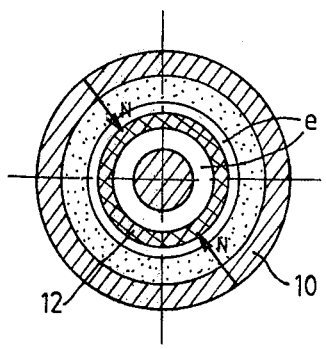
FIG. 7 is a cross-sectional view along line VII—VII of FIG. 6.
Figure 6:
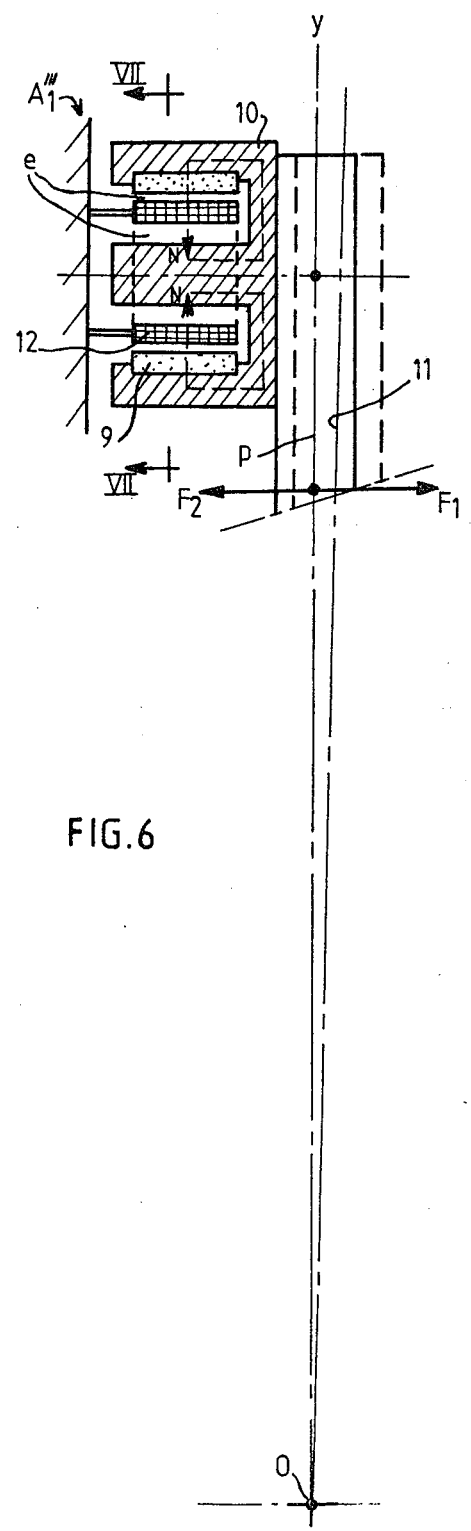
FIG. 6 is a partially schematic view in axial cross section showing in an exemplifying form of embodiment a third electromagnetic mechanism for orienting the platform.

In another form of embodiment shown on FIGS. 6 and 7 each electromagnetic device A'''1 comprises an annular permanent magnet of radial magnetization 9 to close the magnetic flux through a yoke 10 and which is secured to platform 11 containing plane p.

In the flux of annular gap e there is mounted a circular coil 12 secured to the supporting plane, and the current in the coil causes, depending on its direction of flow, movement of platform 11 under the action of force F1 or F2.

It is to be understood that these conceptually equivalent variations of the electromagnetic devices can be completed by any other electromagnetic device producing the same effects.

It has been mentioned hereinafter that point O was secured with respect to the stationary plane by means which could be of the mechanical type.

Figure 10:
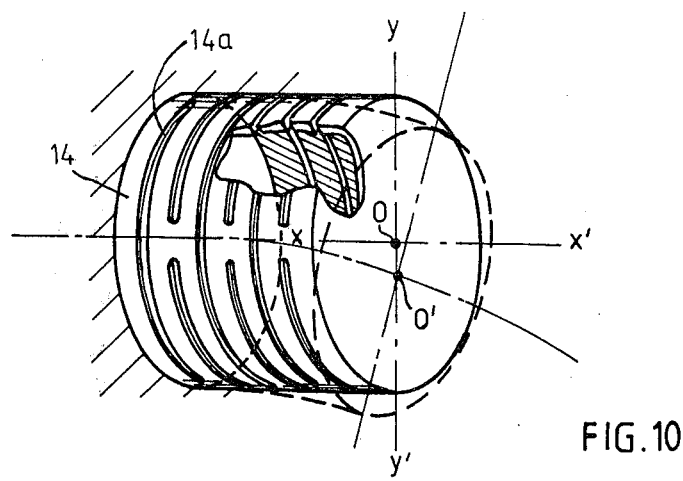
FIG. 10 is a partial view in perspective showing a mechanical system to substantially secure the platform at a predetermined distance from the supporting plane while permitting the latter to move angularly.

To this end there is provided a connection means 14 shown on FIG. 10 and consisting of a thin-walled cylinder of an elastic or flexible material such as for instance beryllium bronze formed with radial openings 14a disposed in staggered relationship in such a way that slight deformations resulting from displacement of point O into O' are suitably absorbed whereas stiffness K remains substantially constant.

Figure 11:
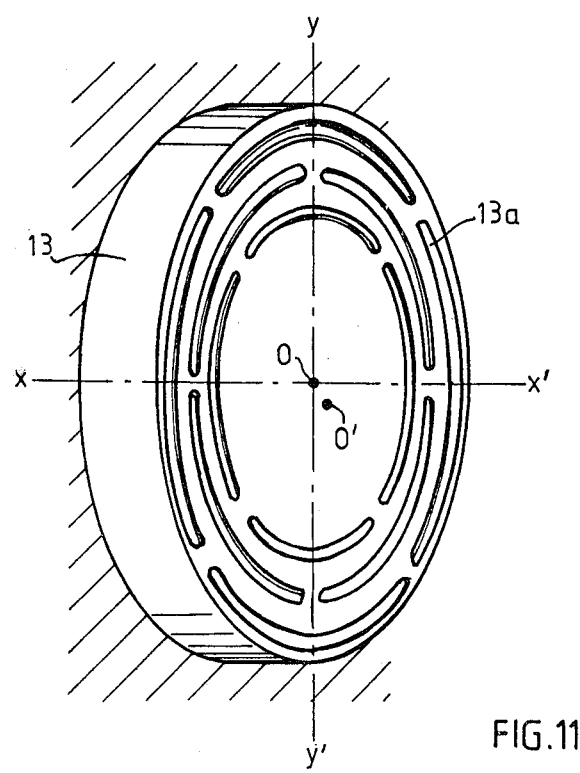
FIG. 11 is a partially perspective view showing another form of embodiment of the mechanical system to substantially secure the platform at the same distance from the supporting plane.

FIG. 11 shows a form of embodiment in which there is a cylinder of the same type 13 having openings 13a alternatively disposed in the radial direction thereby also absorbing slight deformations resulting from movement of point O into O', with stiffness K still remaining substantially constant.

These means are advantageous because they are reliable since breakage by wear and tear of a portion between the openings does not impair the operation of the device.

According to the invention there is provided a locking device to fasten together the movable and the stationary parts during the launching of the satellite. Such mechanisms are well known and used with space vehicles when a rigid connection on a stationary structure is required in an equipment to resist vibrations produced during the launching. This is the case, for instance, with inertia wheels having magnetic suspension.

The locking devices are generally released with the help of pyrotechnical means the firing of which occurs under command of the ground station when the forces necessitating the provision of a locking device have disappeared. It is to be understood that the method described in this application for orienting an aerial or an inertia wheel for a satellite can be applied outside the space domain, in particular, to any terrestrial, aerial or nautical systems in which exact orientation of an instrument-carrying platform is required.

It is also to be understood that the same means can be applied to a platform comprising a different number of electromagnetic devices but that the connections should at least be three in number.

Thus, many combinations can be envisaged, in particular the following:
two reference points and one electromagnetic device
one reference point located in the centre or not and two electromagnetic devices
one reference point in the centre or not and three electromagnetic devices
one reference point and four electromagnetic devices
conforming entirely to the above descriptions.

It will be understood that the present invention was only described in the light of a preferential form of embodiment and that equivalent parts can be substituted for its constitutive elements without departing from the scope of the invention as defined in the appended claims. In this way, the field direction of the magnets and the coil conductor direction can be reversed as compared to the above.

We claim:

1. Apparatus for electromagnetically controlled orientation of a platform in a system with a stationary plane comprising
   a platform spaced relative to a stationary plane and having at least three reference points for inclination movement of said platform with respect to said stationary plane,
   said reference points including, located at said reference points,
   a flexible connection means pivotally connecting said platform to said stationary plane,
   at least one electromagnetic means located between said platform and said stationary plane with each said electromagnetic means including permanent magnet means fixed to said platform,
   a coil fixed to said stationary plane;
   detection means for detection of the deviation of said platform with respect to its orientation with said stationary plane, said detection means located relative to said platform to supply a voltage approximately proportional to said deviation;
   a control loop means to amplify said deviation voltage and to apply resulting current to said coil fixed to said stationary plane, said control loop means electrically connected to said detection means and said coil with the resulting electromagnetic forces generated between said magnet means and said coil by said current producing an angular motion of said platform with respect to said stationary plane.

2. The apparatus of claim 1 further characterized by said flexible connection means being a thin-walled cylinder of elastic material having radial openings disposed in a staggered relationship.

3. The apparatus of claim 1 further characterized by said flexible connection means being a thin-walled cylinder of elastic material having openings alternately disposed in a radial direction.

4. The apparatus of claim 1 further characterized by said control loop means including means to superimpose a predetermined orientation deviation voltage on said deviation voltage supplied by said detection means.

5. The apparatus of claim 4 further characterized by said control loop including
   an amplifier means for amplifying an error signal from said detection means denoting the deviation of said platform with respect to said stationary plane and taking into consideration said predetermined orientation deviation voltage
   a low pass filter connected to said amplifier means to cancel noise from said detection means,
   a filter means connected to said low pass filter to supply a phase lead for current control,
   and power amplifier means connected to said filter means to supply current to each said coil of said electromagnetic means.

6. The apparatus of claim 1 further characterized by
   a reference plane aligned with said platform,
   said permanent magnet means having gaps therebetween and said coil mounted in said gaps perpendicularly to said reference plane.

7. The apparatus of claim 1 further characterized by
   a reference plane aligned with said platform,
   said permanent magnet means having gaps therebetween and said coil mounted in said gaps parallel to said reference plane.

8. The apparatus of claim 1 further characterized by
   a yoke secured to said platform,
   said permanent magnet means being an annular magnet mounted in said yoke having a magnetic field concentrated in said yoke,
   said yoke having annular gaps in said yoke with said coil being disposed in said gap.

9. The apparatus of claim 1 further characterized
   an inertia wheel carried on said platform.

* * * * *